No. 788,248. PATENTED APR. 25, 1905.
S. H. COLEMAN.
CULTIVATOR.
APPLICATION FILED OCT. 6, 1904.
3 SHEETS—SHEET 1.
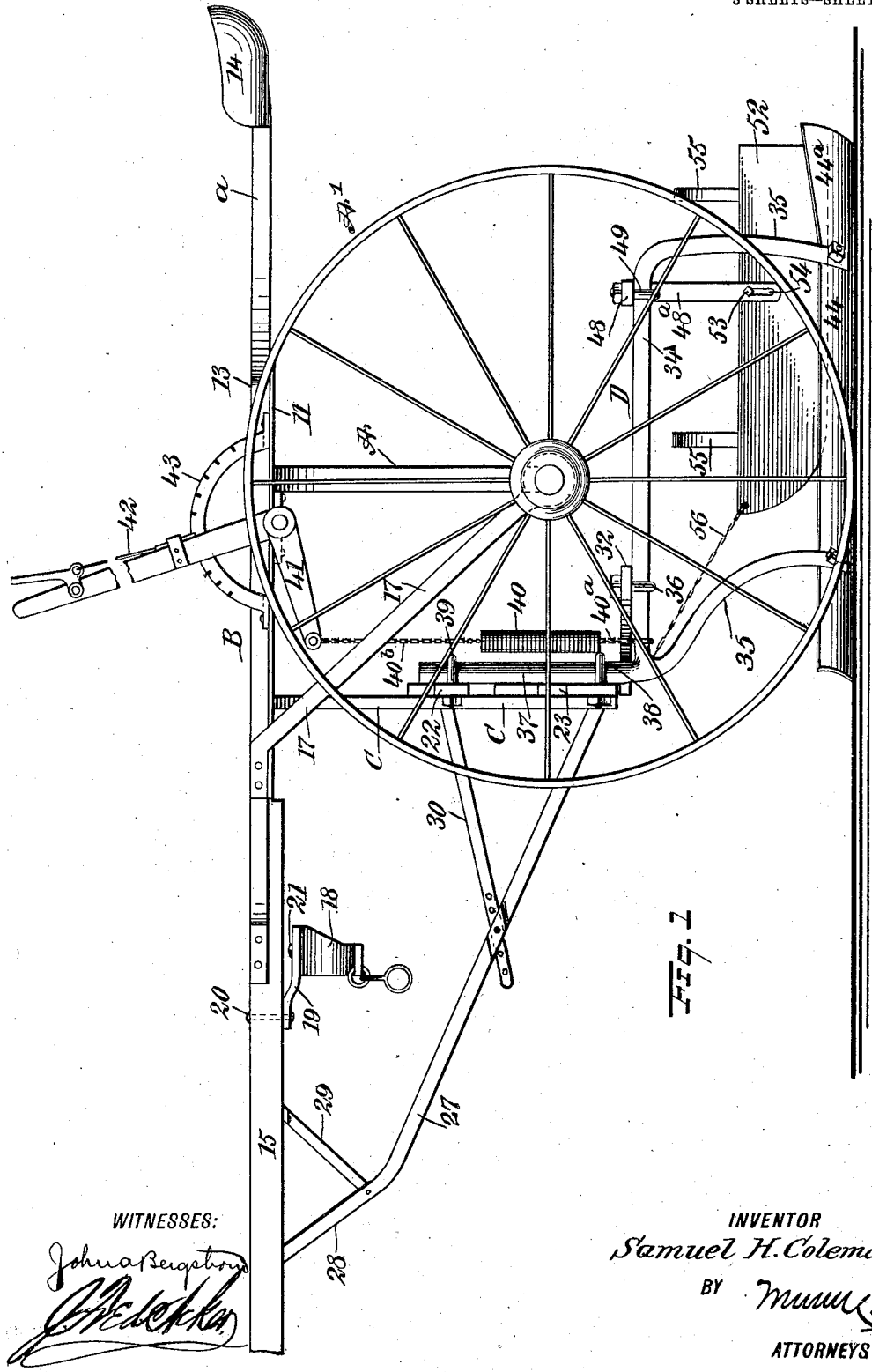
WITNESSES:
INVENTOR
Samuel H. Coleman
BY 
ATTORNEYS

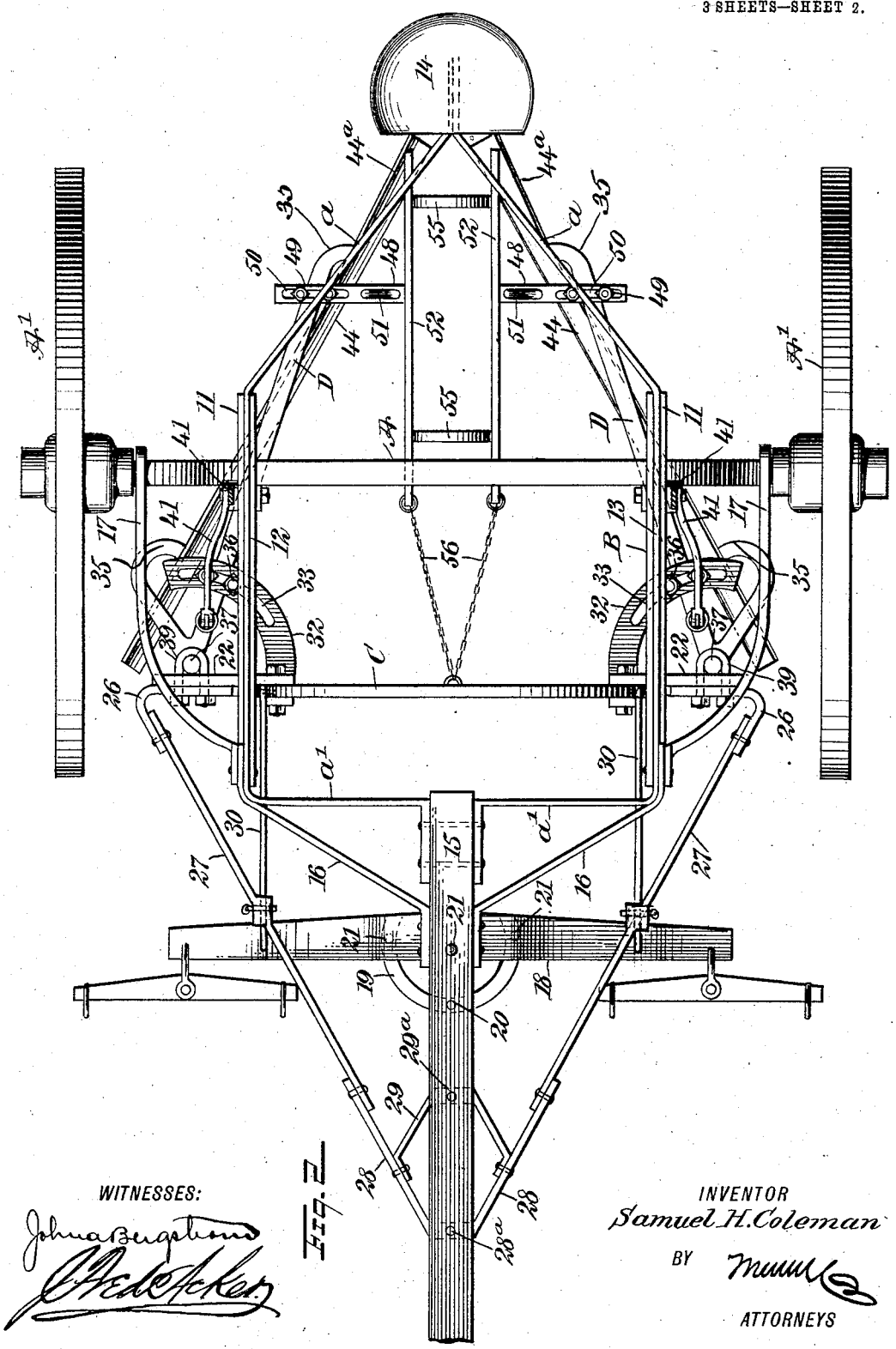

No. 788,248. PATENTED APR. 25, 1905.
S. H. COLEMAN.
CULTIVATOR.
APPLICATION FILED OCT. 6, 1904.
3 SHEETS—SHEET 3.
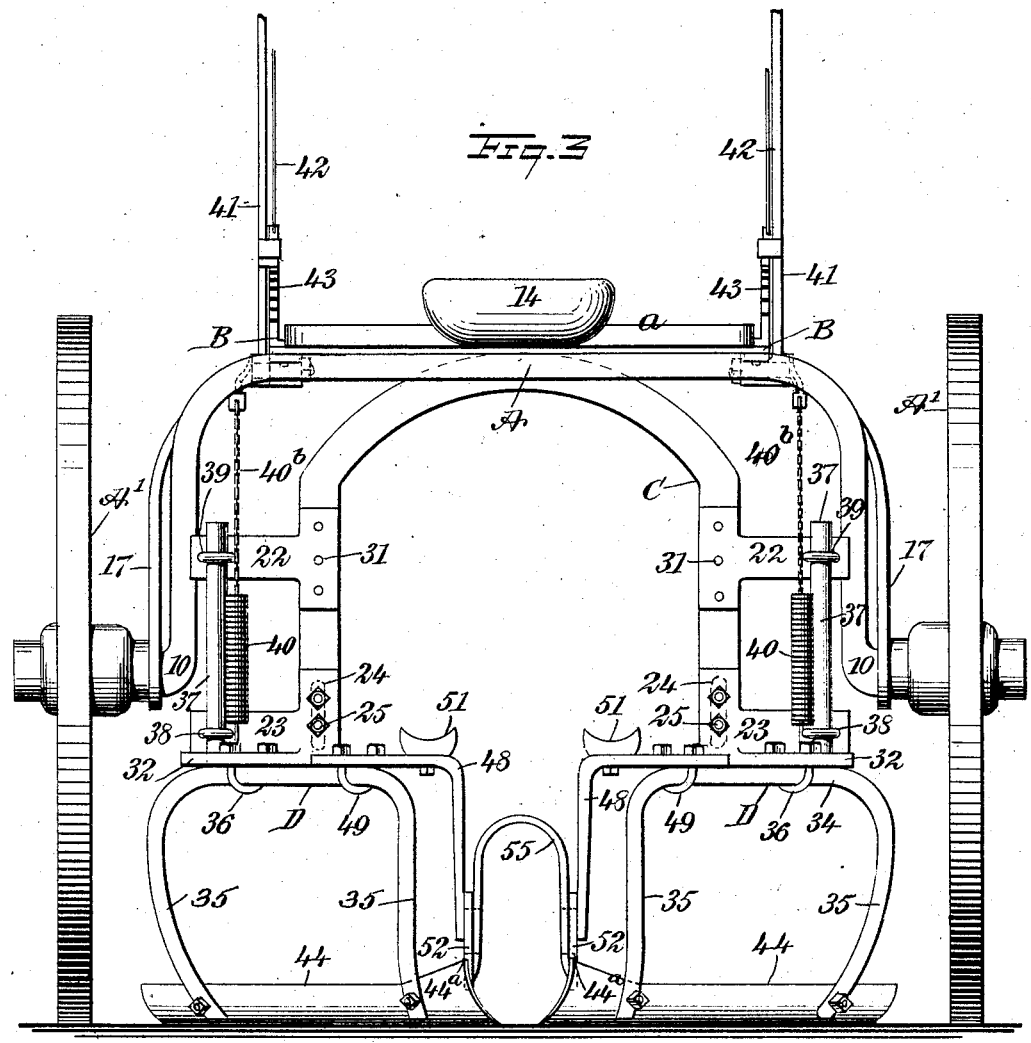
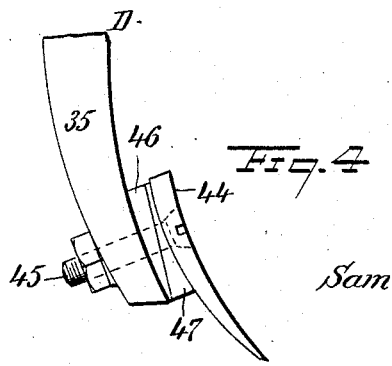
WITNESSES:
INVENTOR
Samuel H. Coleman
BY
ATTORNEYS No. 788,248. Patented April 25, 1905.

UNITED STATES PATENT OFFICE.

SAMUEL H. COLEMAN, OF VILLISCA, IOWA.

CULTIVATOR.

SPECIFICATION forming part of Letters Patent No. 788,248, dated April 25, 1905.

Application filed October 6, 1904. Serial No. 227,373.

*To all whom it may concern:*

Be it known that I, SAMUEL H. COLEMAN, a citizen of the United States, and a resident of Villisca, in the county of Montgomery and State of Iowa, have invented a new and Improved Cultivator, of which the following is a full, clear, and exact description.

My invention relates to a cultivator especially adapted for working corn and garden-truck; and the purpose of the invention is to provide a light, simple, durable, and economic cultivator of such arrangement that the blades or shares may be made to enter more or less deeply in the ground and will cut at each passage all the weeds between the rows, pulverizing the ground and hilling up the plants in many respects better than shovel-cultivators.

Another purpose of the invention is to so construct the cultivator that the blades or shares will enter the ground readily and work equally as well on rough soddy ground as on even and soft ground and will also efficiently operate on a hillside.

A further purpose of the invention is to provide an implement that will not choke or become clogged when cornstalks, trash, or clods are in the way.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved implement. Fig. 2 is a plan view of the same. Fig. 3 is a rear elevation; and Fig. 4 is an end view of one of the blades or shares and a side elevation of a portion of a standard for a blade, illustrating the manner in which the two elements are connected.

A represents a yoke-axle having straight spindles 10, upon which supporting-wheels A' of suitable size are mounted to turn, and B represents the body-frame of the machine. This frame B consists of two parallel angle-bars 11, which are secured upon the axle A at each side of the center of its upper portion, extending forward and rearward from the axle, but much farther forward than rearward, and two strap-bars 12 and 13 are secured to the upright members of the angle-bars 11, following the said angle-bars the extent of their length, and these strap-bars 12 and 13 at the rear ends of the angle-bars are carried rearward in direction of each other and are united to form a horizontal support for the driver's seat 14, the rearwardly-converging members of the straps 12 and 13 being designated as $a$. These straps 12 and 13 at their forward ends are carried horizontally in direction of each other, as is shown at $a'$ in Fig. 2, the forwardly-extending portions of said straps 12 and 13 being secured to the rear portion of the tongue or pole 15, at the heel end thereof. The pole or tongue 15 is further sustained relative to the frame B by means of side braces 16, which are secured to the side portions of the tongue or pole 15 in advance of the members $a'$ of the straps 12 and 13, and these braces 16 are carried to an engagement with the straps 12 and 13, where they engage with the forward ends of the angle-bars 11 and are suitably secured.

The frame B is supported at its forward end by brace-arms 17, which engage with the outer faces of the rear end portions of the braces 16, being secured to the frame B by the same pivot-bolt or bolts which connect the bars 11 with the straps 12 and 13, and the brace-arms 17 at their lower ends are carried to an engagement with the spindles 10 of the axle A.

The draft device 18 is provided at its central portion with a forwardly-arched horizontal member 19, and this arched horizontal member at its central portion is pivotally attached to the tongue or pole 15 by means of a suitable pin 20, as is shown in Figs. 1 and 2, and is attached to the draft device by means of suitable bolts 21. (Shown in the same figures.)

An arch C is located in front of the axle A near the forward end of the frame B. Each side member of the arch C is provided with a horizontal outwardly-extending arm 22, (best shown in Fig. 3,) the arms being located near the upper portions of the said members, and at the lower portions of the side members of the said arch C a second set of horizontal arms 23 are located, extending likewise outwardly in a horizontal direction. The upper arms 22 are stationary; but the lower arms 23 have vertical movement on the arch, and to that end the arch is provided with vertical slots 24, (shown by dotted lines in Fig. 3,) and bolts 25, having suitable nuts, are passed through the inner end portions of the arms 23 and through the said slots 24, and these bolts serve to secure outwardly-extending brace-arms 26 to the forward faces of the side members of the arch, as is shown in Fig. 2. These braces 26 have their outer ends more or less upwardly and forwardly inclined, being attached to the inner ends of side braces 27, the connection being by means of a sliding pivot. The side braces 27 at their upper ends are secured to the members of a V-bar 28, attached to the pole or tongue 15 by means of a suitable bolt $28^a$, and the side members of the V-bar extend downward and rearward, as is shown in Fig. 1. This V-bar 28 is braced by a second and opposing V brace-bar 29, secured by a suitable bolt $29^a$ to the pole or tongue 15, at the rear of the attachment of the main V-bar 28. The side members of this V brace-bar 29 extend downwardly and forwardly and are secured by bolts or otherwise to the side members of the V-bar 28.

Although the construction of the frame is preferably that which has been described, I desire it to be understood that it may be varied in the details of its construction.

The arch C is further supported by means of braces 30, which are pivotally secured to the side members of the arch, and these braces 30 extend forwardly and downwardly, and each has adjustable locking engagement with the corresponding brace-bar 27 through the medium of a socket and a pin, as is shown in Figs. 1 and 2.

A segmental member 32 is made integral with or attached to the inner lower portions of the adjustable lower arms 23, carried by the arch C, and these segmental members are curved rearwardly and outwardly in direction of the sides of the implement, as is best illustrated in Fig. 2. Each of these segmental members 32 is provided with a longitudinal slot 33. (Also particularly shown in Fig. 2.) In connection with each segmental member 32 a blade or share standard D is employed. These standards are practically inverted-U shape, comprising an upper horizontal member 34 and downwardly-extending members 35, which are curved in a forward direction. These shanks or standards D are placed at angles to each other, one at each side of the implement, their rear portions converging to a greater or lesser extent and their forward portions diverging. The extent to which the said shanks D are adjustable to or from each other is controlled by clips 36, which pass around the forward portions of the upper members 34 of the said shanks and extend up through the slots 33 in the segmental members 32, carried from the arch, the upper ends of the clips being provided with suitable nuts.

Where the upper portions 34 of the shanks D connect with the forward downwardly-extending members 35 pillars or posts 37 are attached to the said shanks, and these posts or pillars extend loosely through clips 38 and 39, located, respectively, at the outer rear portions of the lower adjustable arms 23 and the upper stationary arms 22. The shanks are raised and lowered, preferably, by means of the following mechanism, duplicated for each shank: A spring 40, tightly wound, is provided with a lower chain member $40^a$, which, as is best shown in Fig. 1, is attached to the forward portion of the upper member of a standard D, and said spring 40 is further provided with an upper chain member $40^b$, which is attached to the horizontal end of an elbow-lever 41, suitably pivoted on the frame B, and the vertical member of this lever 41 is provided with the usual thumb-latch 42, adapted to engage with a suitable rack 43, carried by the said frame B, as is also shown in Fig. 1. Thus by moving the lever 41 in one direction a lifting action is obtained on the standard or shank with which the spring 40 is connected, and the blades employed are thereby kept from cutting too deep into the ground. Normally the weight of the standard and the attached share or blade will be sufficient to bring the share or blade into working engagement with the ground.

The blades or shares 44, one being provided for each standard D, are of like construction, and their rear or converging ends $44^a$ are made somewhat wider than their remaining portions and serve more or less as moldboards to discharge the material removed by the action of the blades on the ground. The soil, however, should flow freely over the blades their entire length. Without the restraining or uplifting force of the springs $40^b$ the blades or shares 44 would run too deep into the ground, and by means of such lifting devices the extra downward pressure and friction are carried by the wheels, thus making the draft much lighter on the team. This tendency of the blades to readily enter the ground and to remain at an even depth without regard to such obstructions as cornstalks, trash, or soddy or rough ground are among the advantages claimed for the cultivator.

The blades or shares 44 are adjustably connected with the downwardly-extending members 35 of the shanks D in the manner which is particularly shown in Fig. 4, wherein it will be observed that screws 45 are employed, having their heads countersunk in the front faces of the shares or blades, and these screws pass through the members 35 of the shanks and at the rear portions of said members carry suitable nuts; but between the rear faces of the blades or shares 44 and the forward faces of the members 35 of the shanks wedge-blocks 46 and 47, reversely placed, are mounted to slide one upon the other, having suitable slots through which the screws 45 pass, and by loosening the screws 45 and adjusting the wedge-blocks 46 and 47 more or less of an inclination forward or rearward may be given to the blades or shares 44, which blades or shares 44 are curved in cross-section, their forward faces being concaved and their rear faces convexed.

At the rear portion of the upper member 34 of each standard D the horizontal member of an angle-arm 48 is secured by means of suitable clips 49 passing through a slot 50 in said horizontal member, the vertical members 48$^a$ of the said angle-arms being made to extend downward and are attached to shields 52, which are in the nature of parallel plates curved at their forward ends, as is shown in Fig. 1. These shields are adjustably attached to the vertical members of the angle-arms 48 by means, for example, of bolts 53 passed through slots 54 in the said vertical members of the arms 48 and into the said shields. The shields 52 are connected by upwardly-arched members 55, and these shields are adapted to protect the young plants under cultivation, and said shields may be removed when not needed. Each of the angle-arms 48, adapted to support the shields 52, is provided upon its upper member with a foot-rest 51, so that the driver when his feet are on the rest 52 can control the lateral movement of the standards D and the blades or shares carried thereby. Chains 56 are attached to the forward ends of the shields 52, as is shown in Figs. 1 and 2, which chains are brought together at their forward ends and attached to any suitable portion of the frame structure of the implement.

The shields are made movable, so that they can ride over any obstructions and will not tend to clog the machine, and the machine may be used to plow checked corn crosswise and will also do good work in listed corn. It will do particularly good work where stalks or trash are on the ground. Each plowing will clear the field of all cockle-burs, glory-vines, and all weeds. It pulverizes the ground and leaves it nearly level when the blades are set with but little upward slant. The implement can also be used successfully to hill up corn or potatoes as high or higher than is possible with the shovel-cultivator, provided that the blades are set with a decided upward slant. It is particularly adapted for the use of gardeners and truckmen, as it will do the best of work in potatoes, tomatoes, beans, peas, cabbage, and the like, if the rows are wide enough to allow the wheels to come between them. The blades will run under the leaves of the plants, but above their roots, yet close to said plants, thereby cutting out all weeds which cannot be reached by the ordinary cultivator, and it does its work without injury to the most delicate plant.

The cultivator is particularly adapted for use in listed corn, and by reason of its wide range of adjustment it can be made to do excellent work in the first cultivation, while the listed furrow is deep and the corn is small. In Fig. 1 the arch C is shown in a straight up and down position, which holds the blades 44 in a level position on or in the ground; but when the top of the arch is pushed back and secured so that it cannot be moved out of position, which may be accomplished by means of the adjusting device at the forward end of the brace-bars 30, the rear ends of the blades will be depressed and will extend down into the listed furrow, and the forward ends of the blades will be correspondingly raised, and the cutting edges of the blades will be held in an upward and forward slanting position, and the cultivator may then be drawn steadily forward and cannot slide sidewise by reason of the rear ends of the blades being down in the furrow. The depth or amount of soil removed from the edge of the furrow and top of the ridge can be controlled by the operator, and the runner-shaped shields meanwhile protect the young corn from being covered up. At the second cultivation the top of the arch C can be moved forward, so that the blades 44 will run more level, and at the last cultivation the arch can be moved still farther forward, so that the front end of the blade will run deeper and the rear ends be raised, and the soil will then be pushed and thrust high up against the corn.

Having thus described my invention, I claim as new and desire to secure by Letters Patent—

1. In a cultivator, a wheel-supported frame, an arch adjustable in the said frame, standards carried by the said arch, and blades carried by the standards.

2. In cultivators, a wheel-supported frame, an arch capable of forward and rear movement in the frame, standards vertically and laterally adjustable upon the arch, blades carried by the said standards, and a yielding lifting device for the said standards and operatively mounted on the said frame.

3. In a cultivator, a wheeled support, segmental members extending rearwardly from the said support and in direction of the sides of the implement, standards adjustably supported by said segmental members, said standards comprising an upper and downwardly and forwardly curved side members, guides carried by the support, posts extending from the standards, and passing loosely through said guides, and transversely-curved blades supported by the side members of the standards, the standards occupying such position that the rear ends of the blades converge and their forward ends diverge, and means for adjusting the transverse inclination of the said blades.

4. In a cultivator, a wheel-supported adjustable arch, provided with upper horizontal outwardly-extending fixed arms and lower outwardly-extending horizontal arms having vertical movement on the arch, segmental members extending from the movable arms, which segmental members are curved rearwardly and outwardly in direction of the sides of the implement, said segmental members being provided with longitudinal slots, standards each comprising an upper member and downwardly and forwardly curved side members, means for adjustably attaching the upper members of said standards to the said segmental members of the lower adjustable arms on the arch, said standards approaching each other at the rear and diverging at the forward portion of the machine, transversely-curved blades adjustably supported by the side members of the said standards, guides carried by the arms extending from the arch, posts secured to the upper portions of the standards and passed loosely through said guides, adjusting-levers, and connections between the adjusting-levers and the said standards, to raise and lower the same.

5. In a cultivator, a wheel-supported adjustable arch, provided with upper horizontal outwardly-extending fixed arms and lower outwardly-extending horizontal arms having vertical movement on the arch, segmental members extending from the movable arms, which segmental members are curved rearwardly and outwardly in direction of the sides of the implement, said segmental members being provided with longitudinal slots, standards each comprising an upper member and downwardly and forwardly curved side members, means for adjustably attaching the upper members of the standards to said segmental members of the lower adjustable arms on the arch, said standards approaching each other at the rear and diverging at the forward portion of the machine, transversely-curved blades adjustably supported by the side members of the said standards, guides carried by the arms extending from the arch, posts secured to the upper portions of the standards and passed loosely through said guides, elbow-levers located one above each of the said standards, supports for the levers, springs located between the standards and the said levers, the springs being closely wound and provided with upper members connected with the elbow-levers and with lower members connected with the standards.

6. In a cultivator, standards each having an upper horizontal member, supports for the standards, cultivator-blades carried by the standards, angle-arms having horizontal members connected by clips to the upper horizontal members of the standards and vertical members extending in a downward direction between opposing cultivator-blades, shields consisting of parallel plates, having sliding movement on the vertical members of the angle-arms, and connections between the upper portions of the said shields.

7. In a cultivator, a wheeled support, inverted-U-shaped standards adjustably connected with the said support, the standards being located one opposite the other and at angles to each other, blades carried by said standards, converging at their rear ends and diverging at their forward ends, angle-arms having horizontal members secured to the upper members of the standards and vertical members extending downwardly between the standards, shields adjustably attached to the vertical members of the said angle-arms, means for connecting the shields at their upper ends, and foot-rests carried by the said angle-arms, for the purpose described.

8. In a cultivator, a wheel-supported frame, an arch carried by said frame, fixed arms and adjustable arms on said arch, standards carried by the adjustable arms, posts extending from the standards and having guided movement on the arms of the arch, blades carried by the standards, an adjusting-lever, and a yielding connection between the adjusting-lever, and the standards.

9. In a cultivator, a wheel-supported frame, an arch carried by said frame and having upper fixed arms and lower adjustable arms, segmental members extending from the adjustable arms, standards each having an upper horizontal member and downwardly-extending side members, means for adjustably connecting the upper members of the standards to the said segmental members, blades carried by the side members of the standards, posts extending from the upper members of the standards, and extending through guides on the arms carried by the arch, and a yielding lifting device for the standards mounted on the frame.

10. In a cultivator, a wheel-supported frame, an arch carried by the frame, having upper horizontal outwardly-extending fixed arms, and lower outwardly-extending horizontal arms having vertical movement on the arch, segmental members carried by the movable arms, standards adjustably connected with said segmental members, blades carried by the standards, guides carried by the arms extending from the arch, and posts connected with the standards and extending through said guides.

In testimony whereof I have signed my name to this specification in the presence of two subscribing witnesses.

SAMUEL H. COLEMAN.

Witnesses:
 S. S. SHAVER,
 S. C. BAKER.